US008571707B2

(12) United States Patent
Hu et al.

(10) Patent No.: US 8,571,707 B2
(45) Date of Patent: Oct. 29, 2013

(54) GLOVE PUPPET MANIPULATING SYSTEM

(75) Inventors: Jwu-Sheng Hu, Hsinchu (TW); Jyun-Ji Wang, Pingtung (TW); Guan-Qun Sun, Yunlin County (TW); Chi-Him Tang, Cheong Gdn-Kam Sing (TW)

(73) Assignee: National Chiao Tung University, Hsinchu (TW)

( * ) Notice: Subject to any disclaimer, the term of this patent is extended or adjusted under 35 U.S.C. 154(b) by 1102 days.

(21) Appl. No.: 12/503,592

(22) Filed: Jul. 15, 2009

(65) Prior Publication Data

US 2010/0093252 A1    Apr. 15, 2010

(30) Foreign Application Priority Data

Oct. 9, 2008 (TW) .............................. 97138994 A

(51) Int. Cl.
*G06F 19/00* (2011.01)
*G05B 19/42* (2006.01)

(52) U.S. Cl.
USPC ............... 700/245; 700/56; 700/62; 700/83; 700/85; 700/89; 70/257

(58) Field of Classification Search
None
See application file for complete search history.

(56) References Cited

U.S. PATENT DOCUMENTS

| | | | | |
|---|---|---|---|---|
| 4,540,176 A | * | 9/1985 | Baer | 463/37 |
| 4,837,734 A | * | 6/1989 | Ichikawa et al. | 700/249 |
| 5,145,445 A | * | 9/1992 | Northey | 446/329 |
| 5,845,540 A | * | 12/1998 | Rosheim | 74/490.05 |
| 5,967,580 A | * | 10/1999 | Rosheim | 294/198 |
| 2002/0133264 A1 | * | 9/2002 | Maiteh et al. | 700/182 |
| 2003/0039947 A1 | * | 2/2003 | Arlinsky | 434/308 |
| 2005/0095951 A1 | * | 5/2005 | Kempton | 446/327 |
| 2006/0271239 A1 | * | 11/2006 | Gonzalez-Banos et al. | 700/245 |

FOREIGN PATENT DOCUMENTS

| | | |
|---|---|---|
| JP | 10-133733 | 5/1998 |
| JP | 2002-120174 | 4/2002 |
| JP | 2004-78905 | 3/2004 |
| JP | 2005-500912 | 1/2005 |
| TW | 273908 | 4/1996 |
| TW | 293898 | 12/1996 |
| TW | 498791 | 8/2002 |
| TW | 200422085 | 11/2004 |
| TW | 200521800 | 7/2005 |
| TW | M275013 | 9/2005 |
| TW | M279931 | 11/2005 |

(Continued)

OTHER PUBLICATIONS

Kazuhiro Takeda et al.: "Study on Active Avator in Cooperative Virtual Environment," Department of Information and Computer Science, Kagoshima University, 1999, pp. 631-636.

(Continued)

Primary Examiner — Ian Jen
(74) Attorney, Agent, or Firm — Rabin & Berdo, P.C.

(57) ABSTRACT

A glove puppet manipulating system comprises a control module for generating control signals base on movements of human hand and a robot electrically connecting the control module installed inside a glove puppet. The robot has a body manipulating apparatus disposed on a foundation to manipulate the body of the glove puppet to rotate, a pair of hand manipulating apparatuses disposed on the body manipulating apparatus to manipulate the hands of the glove puppet to swivel, and a head manipulating apparatus interposed between the hand manipulating apparatuses on the body manipulating apparatus to manipulate the head of the glove puppet to nod.

32 Claims, 8 Drawing Sheets

(56) References Cited

FOREIGN PATENT DOCUMENTS

| TW | 200601122 | 1/2006 |
|---|---|---|
| TW | I250453 | 3/2006 |
| TW | 200611731 | 4/2006 |
| TW | I255413 | 5/2006 |
| TW | M294971 | 8/2006 |
| WO | WO 2005/046942 A1 | 5/2005 |

OTHER PUBLICATIONS

Naoya Koizumi et al.: "Development of Hand Puppet type Robotic User Interface," TVRSJ, 2006, vol. 11, No. 2, pp. 265-274.

K. Hoshino et al.: "Humanoid robotic hand and its learning by watching," Technical Report of IEICE (The Institute of Electronics, Information and Communication Engineers), 2003, PRMU2003, pp. 97-102.

Tomohiro Shiroma et al.: "Control of Humanoid robotic hand for humanoid communication system," Technical Report of IEICE (The Institute of Electronics, Information and Communication Engineers), Japan, 2003, HIP2003, pp. 89-93.

Mohamed Benali-Khoudja et al., "Tactile interfaces: a state-of-the-art survey." ISR 2004, 35th International Symposium on Robotics, Mar. 23-26, Paris Fance.

Michele Sama et al., "3dID: a Low-power, Low-cost Hand Motion Capture Device." 2006. Proceedings of the conference on Design, automation and test in Europe: Designers' forum, Session: Wireless communication and networking, vol. 2, Mar. 6-10, 2006.

A. Mazzoldi et al., "Smart textiles for wearable motion capture systems." University of Pisa, Pisa, Italy, AUTEX Research Journal, vol. 2, No. 4, Dec. 2002.

\* cited by examiner

GLOVE PUPPET MANIPULATING SYSTEM

RELATED APPLICATIONS

This application claims priority to Taiwan Application Serial Number 97138994, filed Oct. 9, 2008, which is herein incorporated by reference.

BACKGROUND

1. Field of Invention

The present invention relates to an automatic controlling system. More particularly, the present invention relates to an automatic controlling system for manipulating a glove puppet.

2. Description of Related Art

Taiwanese glove puppetry (also called budaisi) is a traditional art, which was first introduced to Taiwan more than 200 years ago and is still popular in Taiwan.

The small glove puppets used in classical glove puppetry are about 30 centimeters in height. The glove puppet's head uses wood carved into the shape of a hollow human head. The head, palms, and feet are made of wood, the puppet's torso and limbs consist entirely of cloth costumes. At performance time, puppeteers put their hands inside the puppets and bring them to life. They can make the puppets dance, drink, write letters, and even fly through the air.

However, when many puppets perform in a single scene, the narrow stage is crowded with puppeteers, which is not only uncomfortable but also limits the performance of the puppets.

Therefore, a new glove puppet manipulating method and system is needed to solve the above problems.

SUMMARY

A glove puppet manipulating system, which uses an automatic or a semi-automatic controlling system to manipulate glove puppets, is provided. The glove puppet manipulating system comprises a control module for generating control signals base on movements of a human hand. A robot is electrically connected to the control module to receive the control signals. The robot can be installed inside a glove puppet to manipulate the glove puppet according to the control signals.

The robot comprises a foundation, a body manipulating apparatus disposed on the foundation, a pair of hand manipulating apparatuses disposed on the body manipulating apparatus, and a head manipulating apparatus interposed between the hand manipulating apparatus on the body manipulating apparatus, wherein the head manipulating apparatus and the foundation are disposed on the opposite ends of the body manipulating apparatus. An extending direction of the body manipulating apparatus substantially goes from the foundation to the head manipulating apparatus. The body manipulating apparatus connects a body of the glove puppet to manipulate the body of the glove puppet to rotate relative to the foundation according to the control signals, such that the glove puppet can be manipulated to twist its waist or to bend its back. The pair of hand manipulating apparatuses connect to hands of the glove puppet separately to manipulate the respective hand of the glove puppet to swivel relative to the body according to the control signals, such that the glove puppet can be manipulated to raise its arms or rotate its shoulders. The head manipulating apparatus connects to a head of the glove puppet to manipulate the head of the glove puppet to nod.

In the foregoing, users can use the control module to control the robot installed inside the glove puppet, and furthermore, to manipulate the glove puppet.

This invention provides another glove puppet manipulating system to manipulate glove puppets by using an automatic or a semi-automatic controlling technology.

The glove puppet manipulating system substantially comprises a data glove for detecting data of movements of a human hand and the robot. The data glove comprises a glove having a plurality of finger cots wearable for human fingers. Each finger cot has two parts, wherein each part pivots on two adjacent joints of the respective finger. The data glove has five angle-measuring sensors disposed on the finger cots. In an embodiment of this invention, the angle-measuring sensors are disposed separately on the two parts of the finger cot for the thumb, the two parts of the finger cot for the middle finger, and one part of the finger cot for the index finger. When the human fingers are worn in the finger cots and bending, the angle-measuring sensors are operable to detect bending angles of the finger cots. A rotating sensor is disposed on the glove to detect a rotating angle of the glove. The data glove has a signal conditioning electrically connected to the angle-measuring sensors and the rotating sensor. The signal conditioning is operable to convert the bending angles into a head control signal, a plurality of left hand control signals, and a plurality of right hand control signals, and to convert the rotating angle into a waist twisting control signal.

The robot is electrically connected to the control module and is installed inside the glove puppet. The robot has a body manipulating apparatus disposed on a foundation for connecting to a body of the glove puppet. The body manipulating apparatus is operable to manipulate the body of the glove puppet to rotate relative to the foundation according to the waist twisting control signal. A left hand manipulating apparatus and a right hand manipulating apparatus disposed on the body manipulating apparatus for connecting to a left hand and a right hand of the glove puppet. The left hand manipulating apparatus is operable to manipulate the left hand to swivel relative to the body according to the left hand control signals, and the right hand manipulating apparatus is operable to manipulate the right hand to swivel relative to the body according to the right hand control signals. A head manipulating apparatus is interposed between the right hand and the left hand manipulating apparatus on the body manipulating apparatus. The head manipulating apparatus connects to a head of the glove puppet to make head nod according to the head control signal.

The invention provides another glove puppet manipulating system. The glove puppet manipulating system comprises a motion capture module and the robot. The motion capture module comprises a camera, a location detecting module, a mean-shift tracking module, and an inverse kinematic module. The camera captures a plurality of images of a first glove puppet manipulated by a human hand. The location detecting module is operable to detect distances between a head and hands of the first puppet of each image. The mean-shift tracking module is operable to calculate the movement of each finger of the human hand according to the distances between the head and the hands of the first puppet. The inverse kinematic module is operable to generate a plurality of control signals according to the movement of each finger. The robot can be installed inside a second glove puppet, and electrically connects the motion capture module to manipulate the second puppet according to the control signals.

In the foregoing, the user can use the control module, the data glove, and/or the motion capture module to control the robot to manipulate the glove puppet to nod, turn, bow, and/or dance. When performance, the user only needs to control the robot installed inside the glove puppet with the control module, instead of inserting his/her hand into the glove puppet.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
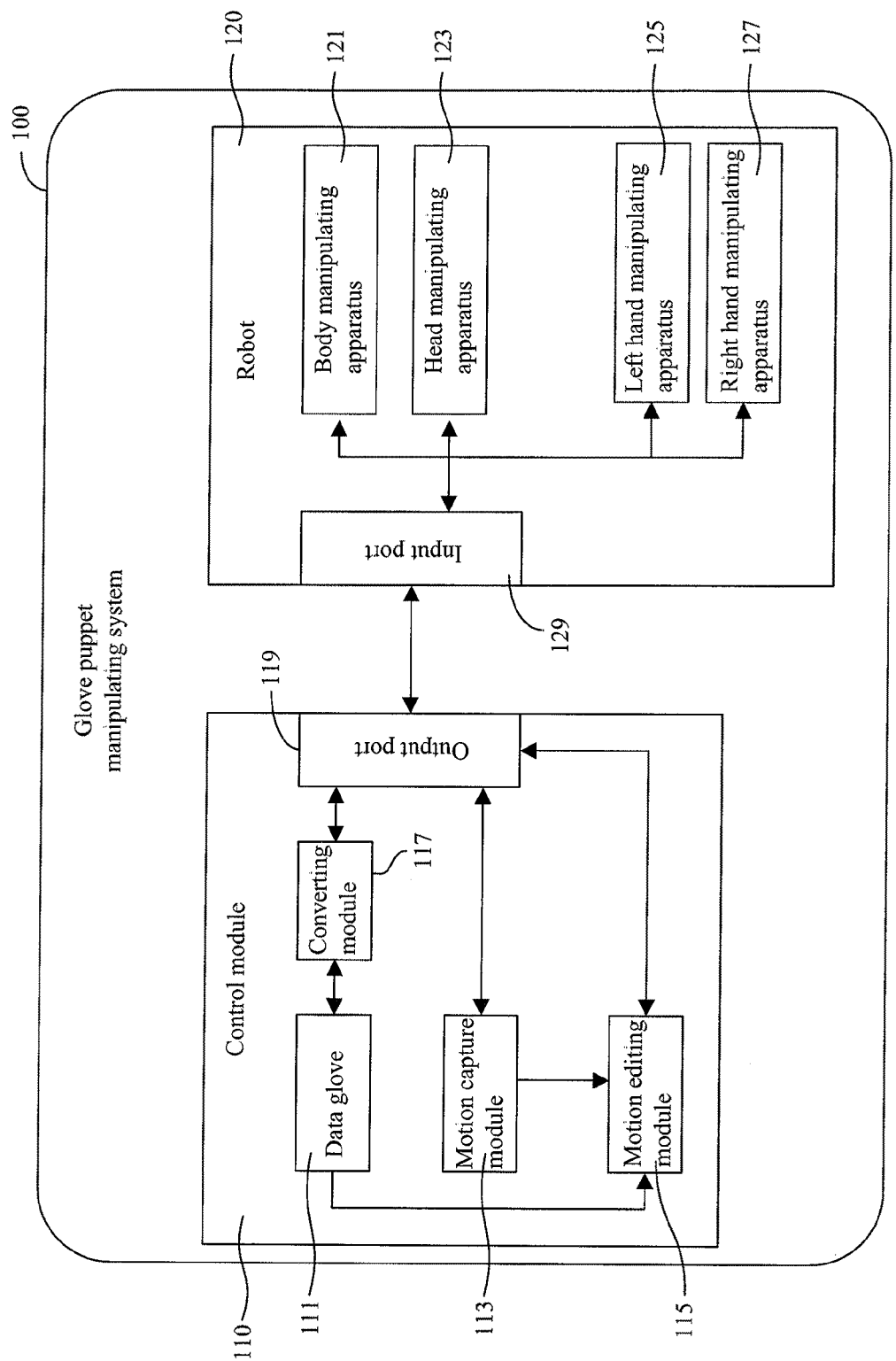
FIG. 1 is a block diagram of a glove puppet manipulating system according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Figure 2:
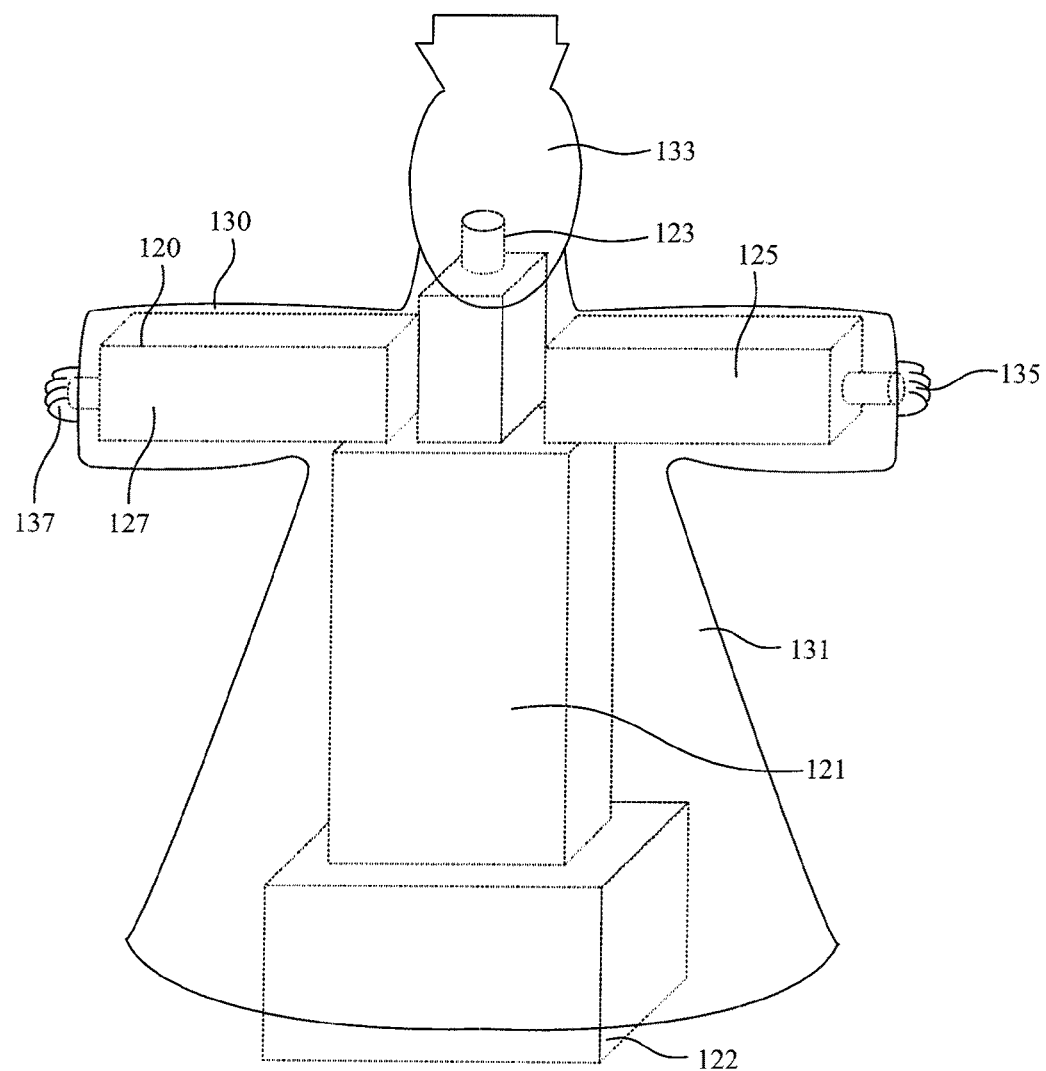
FIG. 2 is a perspective view of a glove puppet and a robot.

Please refer to FIG. 1 and 2. FIG. 1 is a block diagram of a glove puppet manipulating system 100 according to one embodiment of this invention. FIG. 2 is a perspective view of a glove puppet 130 and a robot 120. The glove puppet manipulating system 100 comprises a control module 110 and a robot 120. The control module 110 is operable to generate control signals based on movements of a human hand. The robot 120 is electrically connected to the control module 110 to receive the control signals. The robot 120 can be installed inside a glove puppet 130 to simulate the movements of the human hand, and to manipulate the glove puppet 130 according to the control signals.

The control module 110 can capture movements of a human hand like a hand of a puppeteer, and to generate control signals base on movements of the hand, and furthermore, to transfer the control signals to the robot 120. The control module 110 may comprise a data glove 110, a motion capture module 113, etc., and/or combinations thereof, which can be operated to capture data of the movements of the hands or to capture data of the movements of the puppet manipulated by a human hand. Programs and devices capable of capturing movement data of the hands or the puppet are many, the data glove 110 and the motion capture module 113 described hereinafter as examples not used to limit the spirit and scope of this invention. In the embodiment of this invention, the control module 110 further comprises a motion editing module 115 to edit qualities and timelines of the data. The data then are converted to the control signals, and transferred to an input port 129 of the robot 120 from an output port 119 of the control module 110. The control signals comprises body control signals, head control signals, left hand control signals, and right hand control signals to control different parts of the robot 120, which is described in detail below.

Traditionally, the glove puppet 130 is manipulated by the hand inserted therein. In the embodiment of this invention, the robot 120, instead of the hands, is installed inside the glove puppet 130. The robot 120 comprises a foundation 122, a body manipulating apparatus 121, a head manipulating apparatus 123, and a pair of hand manipulating apparatuses, which comprises a left hand manipulating apparatus 125 and a right hand manipulating apparatus 127.

The body manipulating apparatus 121 is disposed on the foundation 122. The body manipulating apparatus 121 connects a body 131 of the glove puppet 130. The body 131 of the glove puppet 130 is usually made of cloth. The body manipulating apparatus 121 is inserted or pivoted inside the body 131 of the glove puppet 130. When the robot 120 received the control signals, the body manipulating apparatus 121 is operable to manipulate the body 131 of the glove puppet 130 to rotate relative to the foundation 122 according to the body control signals. Therefore, the glove puppet 130 can be manipulated to twist its waist or to bend its back.

The head manipulating apparatus 123 is interposed between the hand manipulating apparatuses disposed on the body manipulating apparatus 121. The head manipulating apparatus 123 connects to a head 133 of the glove puppet 130. Generally, the head 133 of the glove puppet 130 has a hollow cave inside for contain a fingertip of the puppeteers. In the embodiment of this invention, the head manipulating apparatuses 123 is contained inside the hollow cave of the head 133 of the glove puppet 130. The head manipulating apparatus 123 is operable to manipulate the head 133 of the glove puppet 130 to nod.

The hand manipulating apparatuses, which are the left hand manipulating apparatus 125 and the right hand manipulating apparatus 127, are disposed on the body manipulating apparatus 121. In the embodiment of this invention, the left hand manipulating apparatus 125 and the right hand manipulating apparatus 127 are disposed on two opposite side of the head manipulating apparatuses 123. The left hand manipulating apparatus 125 and the right hand manipulating apparatus 127 connect to a left hand 135 and a right hand 137 of the glove puppet 130 respectively. Generally, each of the left hand 135 and the right hand 137 has a hollow cave inside to contain the fingertip of the puppeteers. In the embodiment of this invention, the left hand manipulating apparatus 125 and the right hand manipulating apparatus 127 are contained inside the hollow caves of the left hand 135 and the right hand 137 respectively. When the robot 120 received the control signals, the left hand manipulating apparatus 125 and the right hand manipulating apparatus 127 are operable to manipulate the respective hand of the glove puppet 130 to swivel relative to the body 131 according to the right hand and the left hand control signals, such that the glove puppet 130 can be manipulated to raise its arms or rotate its shoulders.

Figure 3:
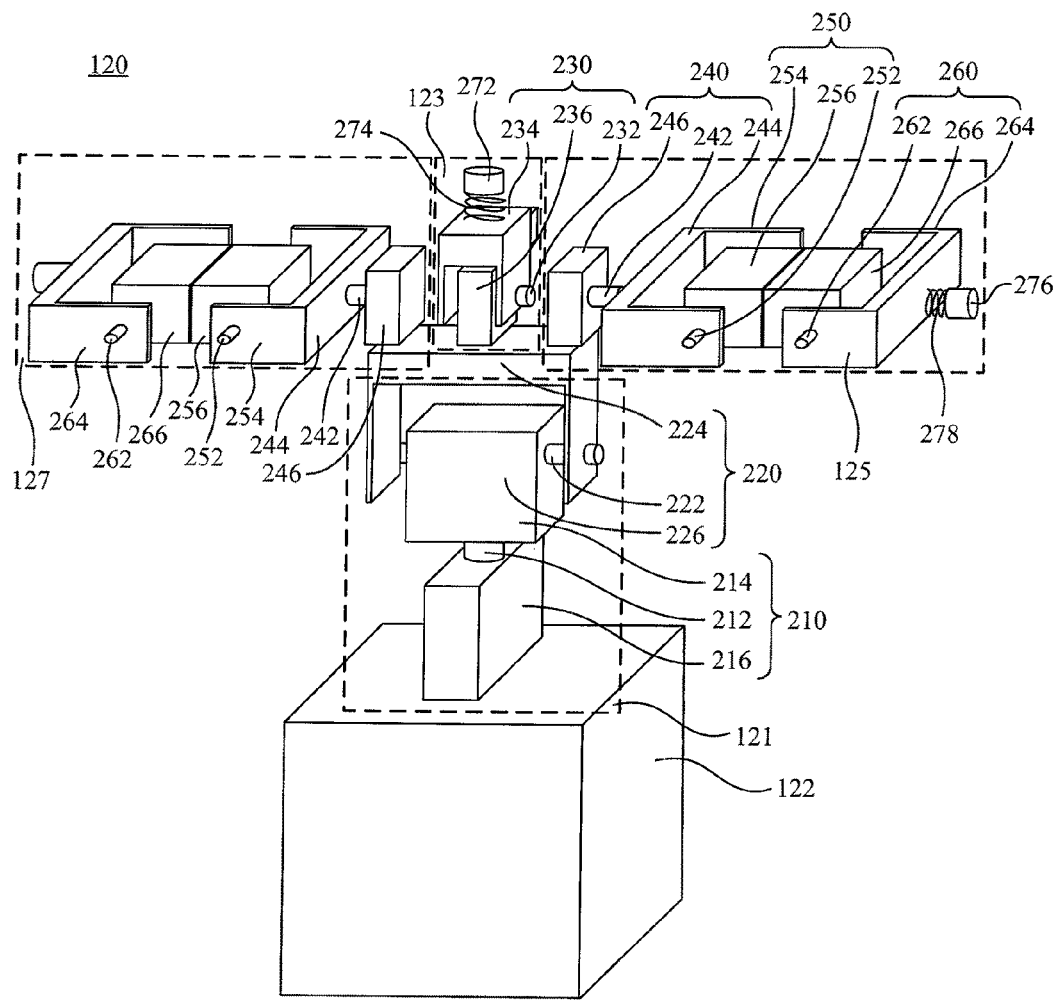
FIG. 3 is a perspective view of the robot according to one embodiment of this invention.

Detail structures and functions of the robot 120 are described as follows. Please refer to FIG. 2 and FIG. 3 at the same time. FIG. 3 is a perspective view of the robot 120 according to one embodiment of this invention.

The body manipulating apparatus 121 of the robot 120 comprises a waist twisting module 210 to manipulate the body 131 of the puppet 130 to rotate like waist twisting or turning over. The waist twisting module 210 comprises a waist twisting motor 216 connected to the foundation 122, a waist twisting axle 212 disposed on the waist twisting motor 216, and a waist twisting block 214 connected to the waist twisting axle 212. The waist twisting axle 212 is disposed along an extending direction of the body manipulating apparatus 131, wherein the extending direction of the body manipulating apparatus 131 is substantially from the foundation 122 to the head manipulating apparatus 123. The waist twisting motor 216 drives the waist twisting axle 212 and the waist twisting block 214 to rotate according to the body control signals. In the embodiment of this invention, the waist twisting motor 216 drives the waist twisting block 214 to rotate relative to the foundation 122 such that the body 131 of the puppet 130 can be manipulated to move like waist twisting or turning over.

The body manipulating apparatus 121 of the robot 120 further comprises a back bending module 220 to manipulate the body 131 of the puppet 130 to bend like making a bow. The back bending module 220 comprises a back bending motor 226 interposed between the foundation 122 and the head manipulating apparatus 123. The back bending motor 226 may selectively be disposed on the waist twisting block 214, the waist twisting motor 216, or the foundation 122. In the embodiment of this invention, the back bending motor 226 is fastened on the waist twisting block 214. A back bending axle 222 is disposed on the back bending motor 226, wherein the back bending axle 222 is not parallel to the extending direction of the body manipulating apparatus 131, which means the back bending axle 222 is not parallel to the waist twisting axle 212. In the embodiment of this invention, the back bending axle 222 is substantially vertical to the waist twisting axle 212. A back bending block 224 is connected to the back bending axle 222. When the robot 120 received the control signals, the back bending motor 226 drives the back bending axle 222 and the back bending block 224 to rotate according to the body control signals. In the embodiment of this invention, the back bending motor 226 drives the back bending block 224 to rotate around the back bending axle 222. Due to the displacement of the bending axle 222, when the back bending block 224 rotating, an included angle between the back bending block 224 and the foundation 122 is changed, such that the body 131 of the puppet 130 can be manipulated to bend like making a bow.

The head manipulating apparatus 123 of the robot 120 is substantially operable to manipulate the head 133 of the glove puppet 130 to nod or look up. The head manipulating apparatus 123 comprises a nodding module 230, which comprises a nodding motor 236, a nodding axle 232, and a nodding block 234. The nodding motor 236 is fastened on the back bending block 224 of the back bending module 220 of the body manipulating apparatus 121. The nodding axle 232 is disposed on the nodding motor 236. The nodding axle 232 is substantially not parallel to the waist twisting axle 212, which means the nodding axle 232 is not parallel to the extending direction of the body manipulating apparatus 131. In particular, the nodding axle 232 is substantially parallel to the back bending axle 222. In the embodiment of this invention, the nodding axle 232 is substantially vertical to the waist twisting axle 212. The nodding block 234 is connected to the nodding axle 232. When the robot 120 received the control signals, the nodding motor 236 drives the nodding axle 232 and the nodding block 234 to rotate according to the head control signals. In the embodiment of this invention, the nodding motor 236 drives the nodding block 234 to rotate around the nodding axle 232. Due to the displacement of the nodding axle 232, when the nodding block 234 rotating, an included angle between the nodding block 234 and the body manipulating apparatus 121 is changed, such that the head 133 of the puppet 130 can be manipulated to bend like nodding or raising up.

Each of the left hand manipulating apparatus 125 and the right hand manipulating apparatus 127 is operable to manipulate the respective hand of the glove puppet 130 to move like rotating the shoulder, raising the arm, and bending the elbow. In the embodiment of this invention, each of the left hand manipulating apparatus 125 and the right hand manipulating apparatus 127 comprises three modules to achieve the above movements. The structure of the left hand manipulating apparatus 125 is described as follows. The structure of the left hand manipulating apparatus 125 is similar to the structure of the right hand manipulating apparatus 127 in the embodiment of this invention.

The left hand manipulating apparatus 125 comprises a shoulder rotating module 240 substantially operable to manipulate the shoulder of the glove puppet 130 to rotate. The shoulder rotating module 240 comprises a shoulder rotating motor 246, a shoulder rotating axle 242 disposed on the shoulder rotating motor 246, and a shoulder rotating block 244 connected to the shoulder rotating axle 242. The shoulder rotating motor 246 connected to the body manipulating apparatus 121. In the embodiment of this invention, the shoulder rotating motor 246 is fastened on the back bending block 224 of the back bending module 220 of the body manipulating apparatus 121.

The shoulder rotating axle 242 is disposed along an extending direction of the left hand manipulating apparatus 125, wherein the extending direction of the left hand manipulating apparatus 125 is substantially from an end of the left hand manipulating apparatus 125 connected to the body manipulating apparatus 121 to the other end of the left hand manipulating apparatus 125. Specifically, the shoulder rotating axle 242 is substantially not parallel to the waist twisting axle 212. In the embodiment of this invention, the shoulder rotating axle 242 is substantially vertical to the waist twisting axle 212, which means the shoulder rotating axle 242 is substantially vertical to the extending direction of the body manipulating apparatus 131. In particular, the shoulder rotating axle 242 is substantially parallel to the nodding axle 232. When the robot 120 received the control signals, the shoulder rotating motor 246 drives the shoulder rotating block 244 to rotate around the shoulder rotating axle 242 according to the left hand control signals, such that the shoulder rotating block 244 brings the left hand shoulder of the glove puppet 130 to rotate relative to the body manipulating apparatus 121 and the body 131 of the glove puppet 130.

The left hand manipulating apparatus 125 further comprises an arm swiveling module 250 substantially operable to manipulate the shoulder of the glove puppet 130 to bend. The arm swiveling module 250 comprises an arm swiveling motor 256, an arm swiveling axle 252 disposed on the arm swiveling motor 256, and an arm swiveling block 254 connected to the arm swiveling axle 252. The arm swiveling axle 252 is substantially not parallel to the extending direction of the left hand manipulating apparatus 125 or the shoulder rotating axle 242. In particular, the arm swiveling axle 252 is substantially vertical to the shoulder rotating axle 242 and the extending direction of the left hand manipulating apparatus 125.

The arm swiveling block 254 is connected to the arm swiveling motor 256 through the arm swiveling axle 252. The displacement of the elements of the left hand manipulating apparatus 125 can be changed without affecting the function thereof. For example, one of the arm swiveling block 254 and the arm swiveling motor 256 may be fastened selectively on the shoulder rotating block 244, the shoulder rotating motor 246, or other elements on the left hand manipulating apparatus 125. In the embodiment of this invention, the arm swiveling block 254 is fastened on the shoulder rotating block 244.

When the robot 120 received the control signals, the arm swiveling motor 256 drives the arm swiveling block 254 to rotate around the arm swiveling axle 252 to change an included angle between the arm swiveling block 254 and the arm swiveling motor 256 according to the left hand control signals. In the embodiment of this invention, the arm swiveling block 254 is fastened on the shoulder rotating block 244, such that an included angle between the arm swiveling block 254 and the shoulder rotating motor 246 and an included angle between the arm swiveling block 254 and the body manipulating apparatus 121 are changed. Therefore, the arm swiveling module brings the left hand 135 of the glove puppet 130 to bend like raising the arm.

The left hand manipulating apparatus 125 further comprises an elbow bending module 260 substantially operable to manipulate the elbow of the glove puppet 130 to bend. The elbow bending module 260 comprises an elbow bending motor 266, an elbow bending axle 262 disposed on the elbow bending motor 266, and an elbow bending block 264 connected to the elbow bending axle 262. The elbow bending axle 262 is substantially not parallel to the shoulder rotating axle 242. In the embodiment of this invention, the elbow bending axle 262 is substantially vertical to the shoulder rotating axle 242, and substantially parallel to the arm swiveling axle 252.

The elbow bending motor 266 is connected to the arm swiveling module 250 to move with the arm swiveling module 250. As the above, the displacement of the elements of the left hand manipulating apparatus 125 can be changed without affecting the function thereof. The elements of the elbow bending module 260 may connect to elements of the left hand manipulating apparatus 125 according to designs. For example, one of the elbow bending blocks 264 and the elbow bending motor 266 may be fastened selectively on the shoulder rotating module 240, the arm swiveling module 250, or other elements on the left hand manipulating apparatus 125. In the embodiment of this invention, the elbow bending motor 266 is connected to the arm swiveling motor 256.

The elbow bending block 264 is connected to the elbow bending motor 266 through the elbow bending axle 262. When the robot 120 received the control signals, the elbow bending motor 266 drives the elbow bending block 264 to rotate around the elbow bending axle 262 to change an included angle between the elbow bending block 264 and the elbow bending motor 266 according to the left hand control signals. Furthermore, an included angle between the elbow bending block 264 and the arm swiveling block 254 are changed such that the elbow bending module 260 brings the left hand 135 of the glove puppet 130 to bend the elbow.

In the embodiment of this invention, the robot 120 comprises at least nine modules in charge of different movements of the glove puppet 130. Each module is operated according to a set of control signals. In the embodiment of this invention, the control signals comprise two sets of body control signals, which are a waist twisting control signal and a back bending control signal, a set of head control signal, which is a nodding control signal, three sets of left hand control signals, which are a shoulder rotating control signal, a arm swiveling control signal, and a elbow bending control signal, and three sets of left hand control signals, which are similar to the left hand control signals. The modules are the waist twisting module 210, the back bending module 220, the nodding module 230, the shoulder rotating module 240 of the left hand manipulating apparatus 125, the arm swiveling module 250 of the left hand manipulating apparatus 125, the elbow bending module 260 of the left hand manipulating apparatus 125, the shoulder rotating module 240 of the right hand manipulating apparatus 127, the arm swiveling module 250 of the right hand manipulating apparatus 127, and the elbow bending module 260 of the right hand manipulating apparatus 127.

Alternatively, the head manipulating apparatuses 123 is contained inside the hollow cave of the head 133 of the glove puppet 130. The left hand manipulating apparatus 125 and the right hand manipulating apparatus 127 are contained inside the hollow caves of the left hand 135 and the right hand 137 respectively.

To prevent the glove puppet 130 and the robot disconnecting, the head manipulating apparatuses 123 of the embodiment of this invention further comprises a connecter 272 and an elastic element 274 to connect the head 133. In particular, the elastic element 274 is connected to the connecter 272 and the nodding block 234. When the robot 120 is installed inside the glove puppet 130, the connecter 272 touches the head 133. Furthermore, the elastic element 274 may push the connecter 272 to be jammed inside the hollow cave of the head 133.

The left hand manipulating apparatus 125 and the right hand manipulating apparatus 127 have structures similar to the head manipulating apparatuses 123. In particular, each of the left hand manipulating apparatus 125 and the right hand manipulating apparatus 127 has a hand connecter 276 for connecting to the respective hand of the glove puppet 130, and a hand elastic element 278 connected the hand connecter 276 and the elbow bending block 264. When the robot 120 is installed inside the glove puppet 130, the hand connecters 276 of the left hand manipulating apparatus 125 and the right hand manipulating apparatus 127 contact the respective hand of the glove puppet 130. Furthermore, the hand elastic element 278 may push the hand connecters 276 to be jammed inside the hollow cave of the respective hand of the glove puppet 130.

Figure 4:
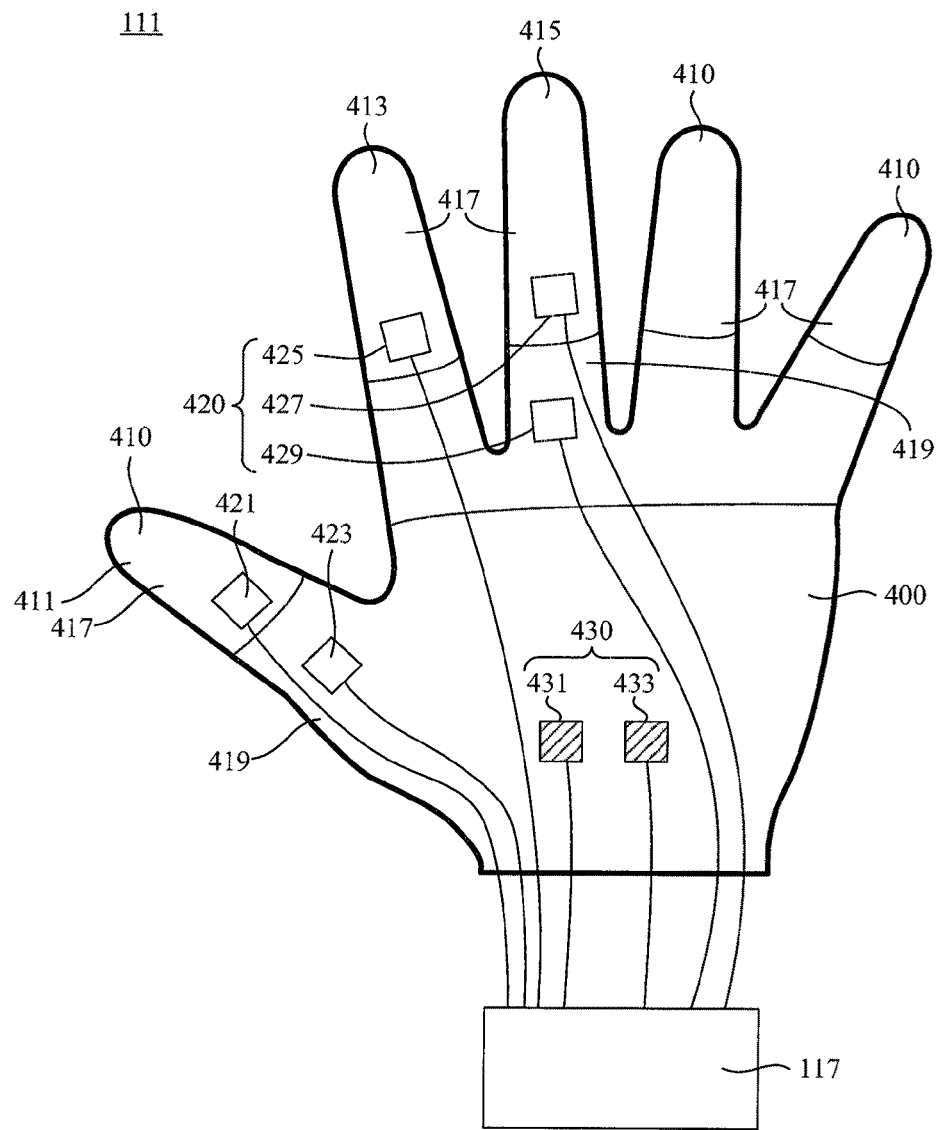
FIG. 4 is a perspective view of the data glove according to one embodiment of this invention.

Please refer to FIG. 4. FIG. 4 is a perspective view of the data glove 111 according to one embodiment of this invention. The data glove 111 has a glove 400 that fits a human hand, and many detecting devices to detect movements of the human hand and record data of the movements like angles, speed, and/or strength of the human hand. The data glove 111 transfers the data to the converting module 117, wherein the converting module 117 is operable to convert the data into the control signals.

The glove 400 of the data glove 111 is wearable for the human hand and flexible, such that the hand worn in the glove 400 can move, make a fist, and/or rotate. The glove 400 is made of flexible material like cloth, leather, plastic material, or combinations thereof.

The glove 400 has a plurality of finger cots 410 wearable for human fingers. In the embodiment of this invention, the finger cots 410 comprises a thumb cot 411, an index finger cot 413, and a middle finger cot 415 for pivoting on the thumb, the index finger, and the middle finger of the human hand. Each finger cot 410 may have an enclosed end to cover the entire finger as illustrated in FIG. 4. Alternatively, the finger cot 410 may have an open end such that the fingertip is exposed when the finger worn in the finger cot 410. In the embodiment of this invention, each finger cot has a first part 417 and a second part 419, wherein the first and the second parts 417 and 419 pivot on two adjacent joints of the respective finger when the finger worn in the finger cot 410.

The data glove 400 has sensors 430 disposed on the glove 400 to detect the movement of a wrist of the human hand. Specifically, the sensors 430 are to detect the movement of a palm tilting or rotating against a forearm of the human hand. The sensors 430 comprise a tilting sensor 431 and a rotating sensor 433. When the human hand worn in the data glove 111 moves, the tilting sensor 431 is operable to detect a tilting angle of the glove 400, and the rotating sensor 433 is operable to detect a rotating angle of the glove 400. Sensors for detecting the tilting angle or the rotating angle are many. In an embodiment of this invention, the rotating sensor 433 is a gyro sensor. In an alternative embodiment of this invention, the sensor 430 further comprises an acceleration sensor disposed on the glove for detecting acceleration of the glove 400 when the human hand moves.

The converting module 117 electrically connected to the tilting sensor 431 and the rotating sensor 433 for receiving the detected tilting angle and the detected rotating angle, and for converting the angles into the control signals. In particular, the converting module 117 is operable to convert the tilting angle into the back bending control signal and to convert the rotating angle into the waist twisting control signal.

The date glove 410 has a plurality of angle-measuring sensors 420 disposed on the finger cots 410. When the fingers worn in the finger cots bending or stretching, the finger cots are bent or stretched accordingly. The angle-measuring sensors 420 are operable to detect bending angles of the finger cots 410. The traditional Taiwanese glove puppet is manipulated substantially by the thumb, the index finger, and the middle finger of the puppeteer. Therefore, in the embodiment of this invention, the angle-measuring sensors 420 are disposed the thumb cot 411, the index finger cot 413, and the middle finger cot 415 to detect the bending angles of the thumb, the index finger, and the middle finger. In the embodiment of this invention, the angle-measuring sensors 420 comprise angle-measuring sensors 421-429.

Traditionally, the index finger of the puppeteer controls the head 133 of the glove puppet 130 to look up or nod, which are basically the motions in one dimension. The sensor 425 is disposed on the first or the second parts 417 and 419 of the index finger cot 413 to detect the bending angle thereof when the index finger of the human hand bending. In the embodiment of this invention, the sensor 425 is disposed on the first parts 417 of the index finger cot 413.

Traditionally, the thumb of the puppeteer controls the movements of the left hand 135 of the glove puppet 130. The two adjacent joints of the thumb controls the movements the shoulder and the elbow of the left hand. To detect the movement of the two adjacent joints of the thumb, the sensor 421 and the sensor 423 are disposed on the first part 417 and the second part 419 of the thumb cot 411 separately. The sensor 421 and the sensor 423 are operable to detect the bending angles of the thumb cot 411 when two adjacent joints of the thumb of the human hand bending.

Traditionally, the middle finger of the puppeteer controls the movements of the right hand 137 of the glove puppet 130. The three joints of the middle finger controls the movements the shoulder and the elbow of the right hand 137. Generally, three angle-measuring sensors 420 may be disposed on the middle finger cot 415 to detect the bending angles of the three joints of the middle finger. In the embodiment of this invention, only two angle-measuring sensors 420 are disposed on the middle finger cot 415 to detect the bending angles of the three joints of the middle finger by using the linkage of the joints of the middle finger. Because the three joints of each finger are linked to one another, the bending angle of one joint can be calculated by the bending angles of the other two joints. In the embodiment of this invention, the sensor 427 is disposed on the first part 417 of the middle finger cot 415, and the sensor 429 is disposed on the second part 419 of the middle finger cot 415.

The angle-measuring sensors 420 are electrically connected to the converting module 117. The converting module 117 is operable to convert the detected bending angles into the respective control signals. Specifically, the converting module 117 is operable to convert the bending angles detected by the angle-measuring sensors 421 and 423 on the thumb cot 411 into the left hand control signals. The converting module 117 is operable to convert the bending angles detected by the sensor 425 on the index finger cot 413 into the head control signals. The converting module 117 is operable to convert the bending angles detected by the angle-measuring sensors 427 and 429 on the middle finger cot 41 5 into the right hand control signals.

The types and the structure of the angle-measuring sensors 420 are many. For example, the angle-measuring sensors 420 may be resistive sensors, fiber optic sensors, piezoelectric film sensors, gyro sensor, or combinations thereof. In the embodiment of this invention, the angle-measuring sensors 420 are piezoelectric film sensors. The piezoelectric film sensor uses the piezoelectric effect to measure pressure, strain or force by converting them into an electrical signal. In detail, the piezoelectric film sensor is discharged and generates an electrical signal when it is pressed. Since the recharging time period is much smaller than the time period of the movement of the finger, the piezoelectric film sensor may generate many electrical signals during singer movement of the finger. Each electrical signal may represent a small bending angle of the finger. Therefore, the total bending angle of the finger can be calculated by multiplying the sum of the electrical signals with the small bending angle.

Figure 5A:
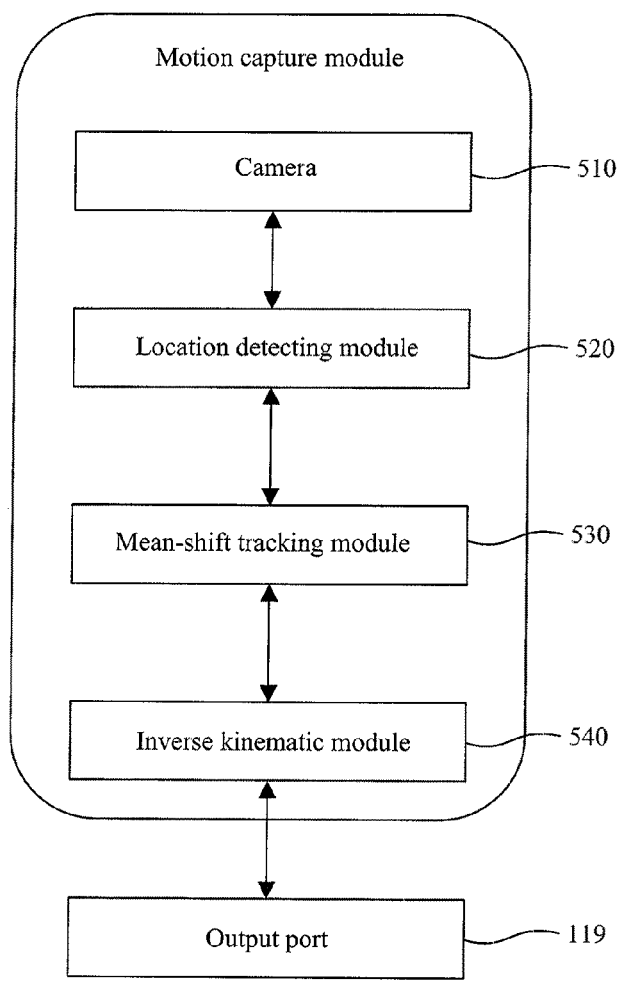
FIG. 5A is a block diagram of a motion capture module according to another embodiment of this invention.
Figure 5B:
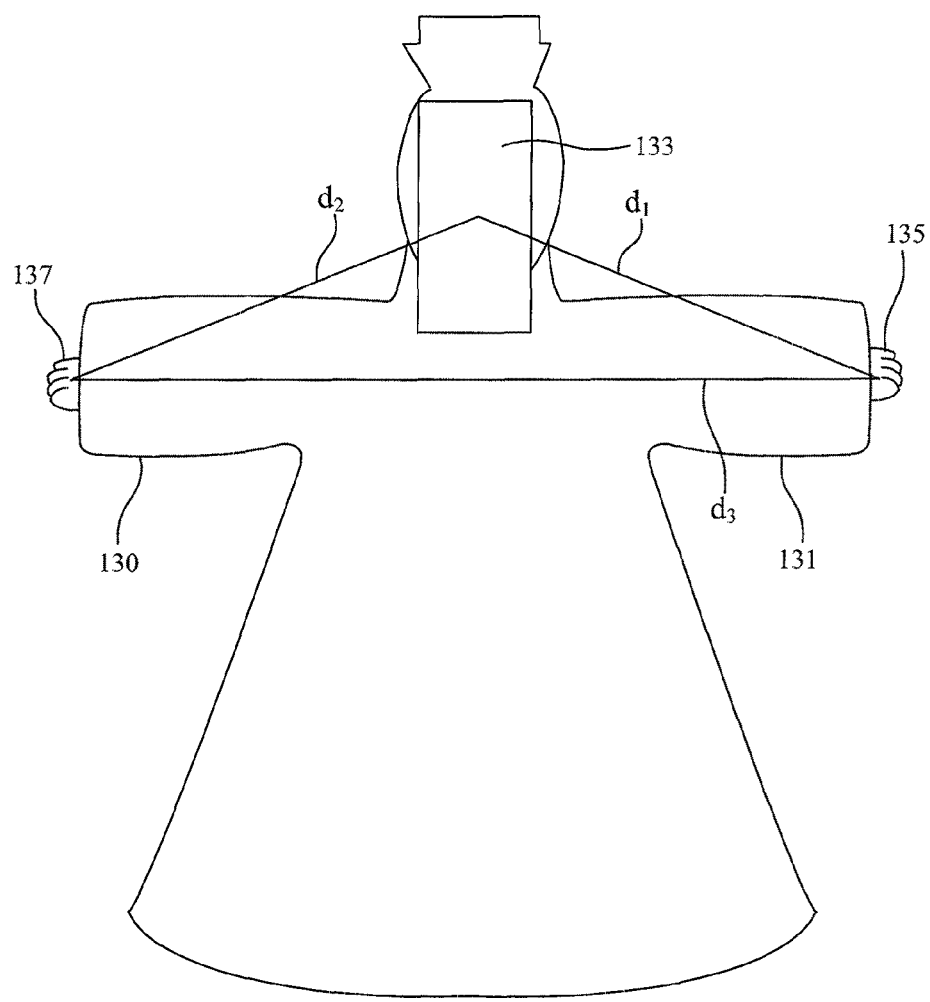
FIG. 5B is a perspective view of the glove puppet.

Please refer to the FIG. 5A and FIG. 5B. FIG. 5A is a block diagram of the motion capture module 113, and FIG. 5B is a perspective view of the glove puppet 130. The motion capture module 113 is operable to capture the movements of a glove puppet 130 manipulated by human hand. Specifically, the motion capture module 113 is operable to capture the movements of the head 133 and the hands 135 and 137 of the glove puppet 130 to calculate the movement of the human hand, and furthermore, to convert the movements of the glove puppet 130 into the control signals.

The motion capture module 113 comprises a camera 510 to capture a plurality of images of the glove puppet 130 manipulated by a human hand. A location detecting module 520 of the motion capture module 113 is operable to detect distances between the head 133 and the hands 135 and 137 of the glove puppet 130 of each image. In particular, the location detecting module 520 is operable to locate the head 133 and the hands 135 and 137 of the glove puppet 130 in each image to determine the locations of the thumb, the index finger, and the middle finger of the puppeteer. Furthermore, the location detecting module 520 is operable to determine a distance d1 between the head 133 and the left hand 135, a distance d2 between the head 133 and the right hand 137, and a distance d3 between the left hand 135 and the right hand 137. In the embodiment of this invention, the location detecting module 520 is operable to track a center of a triangle made from the head 133, the left hand 135 and the right hand 137, and to calculate the distances from the center to the head 133, the left hand 135 and the right hand 137.

After determining the distances between the head 133, the left hand 135 and the right hand 137, a mean-shift tracking module 530 of the motion capture module 113 is operable to calculate the movement of each finger of the human hand according to the change of the distances between the head 133 and the hands 135 and 137. In particular, the mean-shift tracking module 530 is operable to calculate the change of the distances d1, d2, and d3 in each image to determine the movements of the thumb, the index finger, and the middle finger of the puppeteer.

An inverse kinematic module 540 of the motion capture module 113 is operable to generate a plurality of control signals according to the movement of each finger and the distance between the fingers. Alternatively, the inverse kinematic module 540 of the motion capture module 113 may be operated to generate the control signals according to the change of the distances d1, d2, and d3 calculated by the mean-shift tracking module 530.

Figure 6:
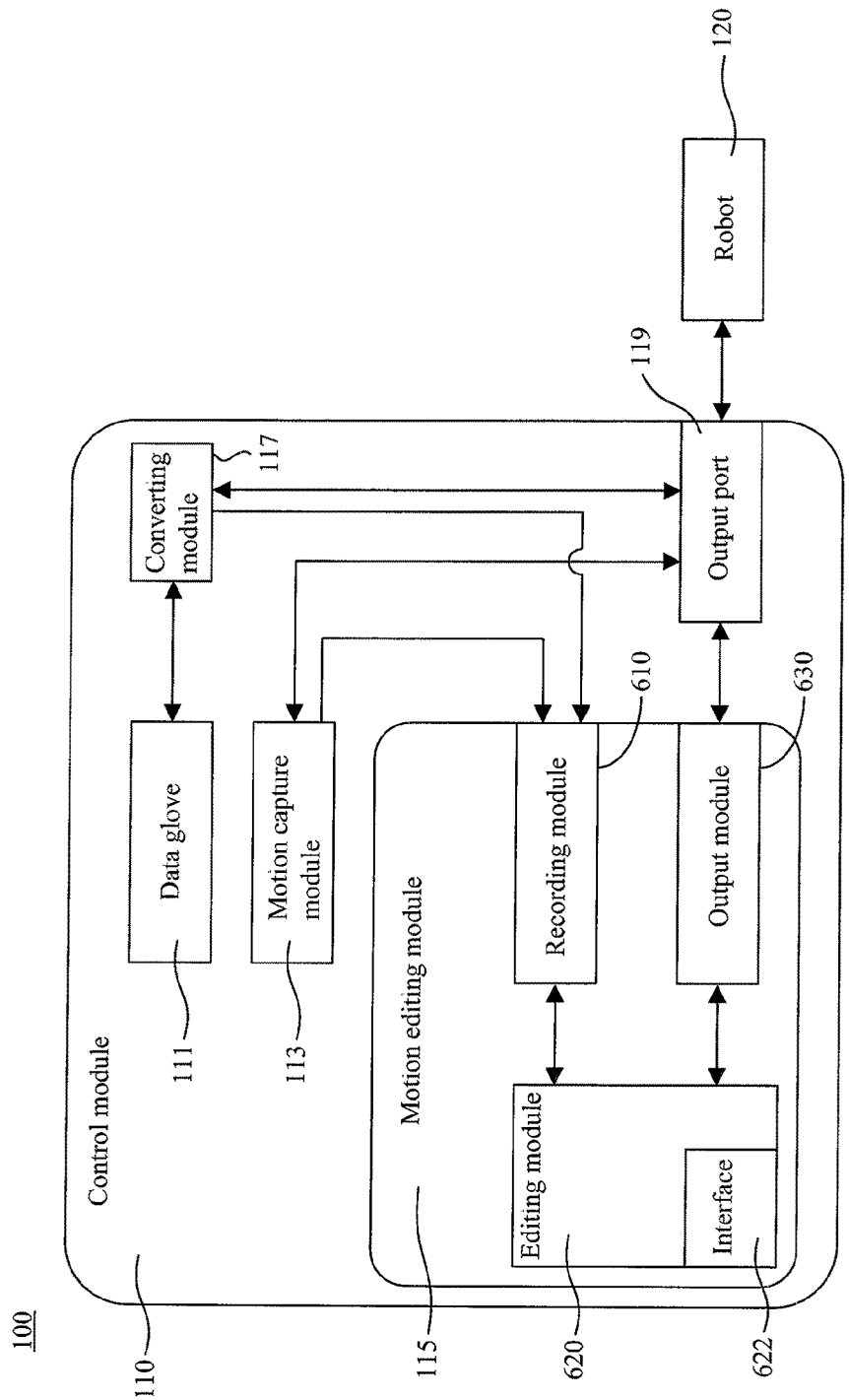
FIG. 6 is a block diagram of a glove puppet manipulating system according to one embodiment of this invention.
Figure 7:
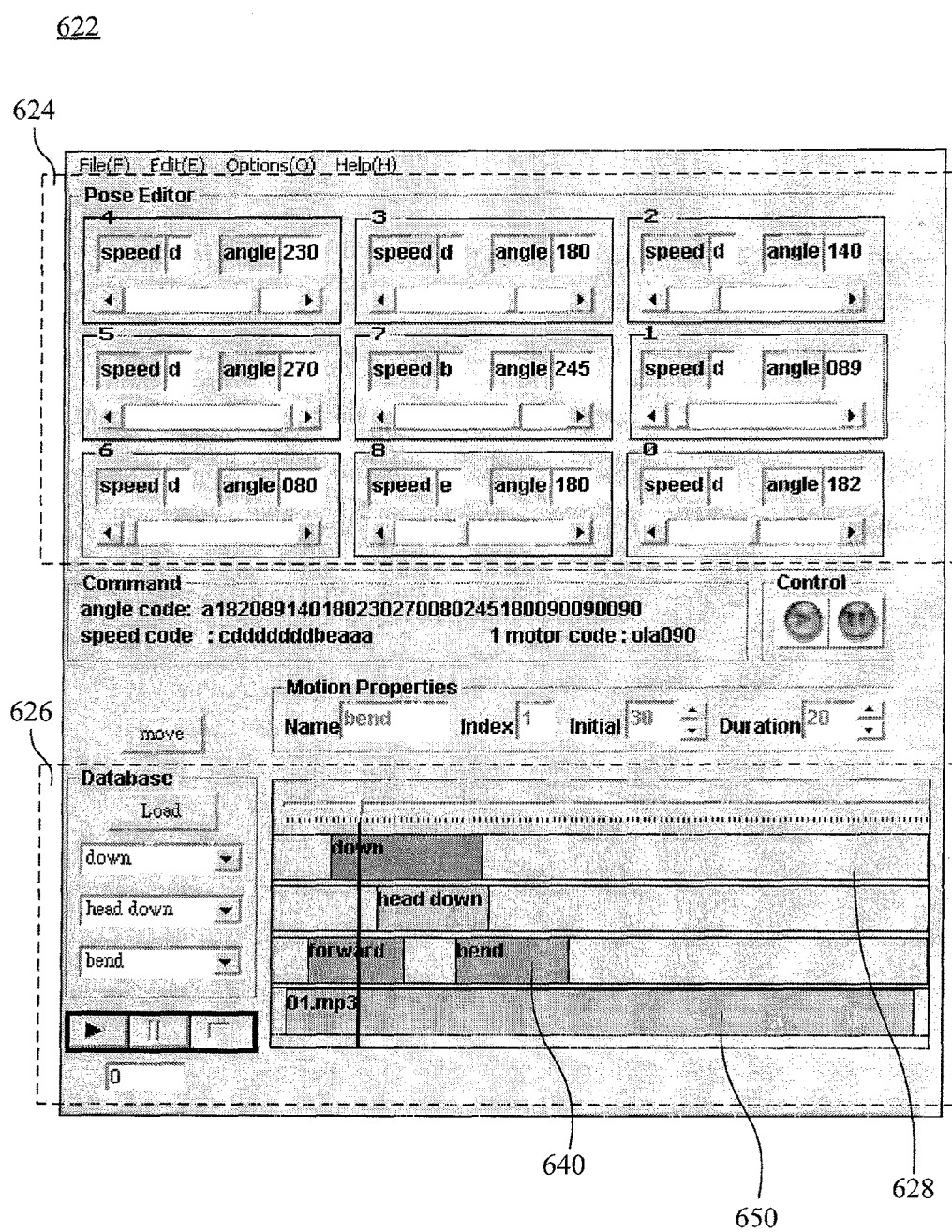
FIG. 7 is a perspective view of an interface for the motion editing module.

Please refer to FIG. 6 and FIG. 7. FIG. 6 is a block diagram of a glove puppet manipulating system 100 and FIG. 7 is a perspective view of an interface 622 for the motion editing module 115. The motion editing module 115 is operable to record the control signals generated by the data glove 111 according to the movements of the human hand, and/or the control signals generated by the motion capture module 113 according to the movements of the glove puppet 130 manipulated by the puppeteer. The motion editing module 115 is operable to edit the control signals, such as remixing the control signals, changing the timeline of the control signals, and etc. The motion editing module 115 comprises a recording module 610, an editing module 620, and an output module 630.

As the above, the data glove 111 or the motion capture module 113 captures the movement of the human hands or the movement of the glove puppet 130 to generate the control signals like the waist twisting control signal, the back bending control signal, the nodding control signal, the left hand control signals, and the right hand control signals. The recording module 610 is operable to record the control signals as a plurality of movement packages 640. In particular, the recording module 610 is operable to record the control signals of a single motion of the human hand or the glove puppet 130 as a movement package 640. Therefore, when the puppeteer manipulates the glove puppet 130 to do the moves like nodding the head 133, walking, waving the hand, and etc, the recording module 610 is operable to record the respective movement packages 640 like a nodding movement package, a walking movement package, a waving movement package, and etc.

The recording module 610 may be electrically connected to the data glove 111, the motion capture module 113, and/or the converting module 117 to receive the control signals. In the embodiment of this invention, the recording module 610 is electrically connected to the converting module 117 to record the control signals, which are converted by the converting module 117 from the date captured by the data glove 111. In the embodiment of this invention, the recording module 610 is further electrically connected to the motion capture module 113 to record the control signals generated from the motion capture module 113.

The editing module 620 is electrically connected to the recording module 610. The editing module 620 is operable to edit the timeline of the movement packages 640, such as changing the starting time, the ending time, and/or the length of the time period of the control signals in the movement packages 640. For example, the editing module 620 can be operated to edit the starting time and/or the ending time of a nodding control signal in a nodding movement package. Therefore, the editing module 620 can determine when to make the glove puppet 130 to nod, for how long, and etc. Alternatively, the editing module 620 can be operated to edit timelines of every sub motions. For example, the editing module 620 can be operated to determine when to make the glove puppet 130 to lower its head 133, and when to raise its head 133. On the other hand, the editing module 620 can be operated to edit the timelines of different control signals, such as the sequence of the left hand control signals, the head control signals, and the right hand control signals, and/or the length of the time period of the control signals.

The editing module 620 comprises an interface 622 for user to use. The interface 622 comprises a timeline editing module 626 operable to editing timeline of the control signals in the movement packages 640. In particular, the timeline editing module 626 comprises a plurality of movement tracks 628. Each movement track 628 is operable to load in one of the control signals like the head control signal. The user may use the movement tracks 628 to edit the control signals, for example, to change the starting time, the ending time, and/or the length of the time period of the control signals in the movement packages 640.

The timeline editing module 626 has many movement tracks 628 to edit different control signals, such as the left hand control signals, the right hand control signals, and the head control signals. Therefore, the timeline editing module 626 can be operated to the timelines of different control signals, such as the sequence of the left hand control signals, the head control signals, and the right hand control signals, and/or the length of the time period of the control signals.

Alternatively, the movement tracks 628 may be operated to edit different movement packages 640. By loading the movement packages 640 to the movement tracks 628 separately, the timeline editing module 626 can edit the timelines of different movement packages 640.

The performance of the glove puppet 130 comprises the motions of the glove puppet 130, and the sound of the show like the music and the narration. In the embodiment of this invention, the timeline editing module 626 further comprises at least a sound track 650 for editing at least a sound signal like the music and the narration. The sound track 650 and the movement tracks 628 may be operated base on the same timeline. Therefore, the user can use the timeline editing module 626 to edit the movements of the glove puppet 130 and the sound of the show.

In the embodiment, the interface 622 further comprises a motor controlling module 624 to control each of the modules of the robot 120 directly. Specifically, the user may input data like the volume of the speed and/or the value of the angle in the motor controlling module 624. The motor controlling module 624 is operable to generate control signals according the input data to drive the respective motor to rotate as the desired speed and/or the desired angle. Alternatively, the control singles generated by the motor controlling module 624 can be recorded as a movement package 640, and furthermore, be edited by the timeline editing module 626.

The output module 630 is electrically connected to the editing module 620, and electrically connected to the robot 120 through the output port 119 of the control module 110. The output module 630 is operable to receive the edited movement packages 640 from the editing module 620, and to transfer the control signals in the edited movement packages 640 to the robot 120 in sequence.

As the above, the glove puppet manipulating system 100 of the embodiment of this invention provides three different ways to generate control signals. The user can use the data glove 111 to generate the control signals according to the movement of the human hand worn in the data glove 111. The user can use the motion capture motion 113 to generate the control signals according to the movement of the glove puppet manipulated by the human hand. The user can use the motion editing module 115 to edit the control signals.

In the foregoing, the user can use glove puppet manipulating system 100 to control the robot 120 to manipulate the glove puppet 130 to nod, turn, bow, and/or dance. When performing, the user only needs to control the robot 120 installed inside the glove puppet 130 with the control module 110, instead of inserting his/her hand into the glove puppet 130.

Although the present invention has been described in considerable detail with reference certain embodiments thereof, other embodiments are possible. Therefore, their spirit and scope of the appended claims should no be limited to the description of the embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A glove puppet manipulating system comprising:
    a control module for generating control signals based on movements of a human hand; and
    a glove puppet; and
    a robot being installed inside the glove puppet and electrically connected to the control module, the robot comprising:
        a foundation;
        a body manipulating apparatus disposed on the foundation for connecting to a body of the glove puppet, the body manipulating apparatus being operable to manipulate the body of the glove puppet to rotate relative to the foundation according to the control signals;
        a pair of hand manipulating apparatuses disposed on the body manipulating apparatus for connecting to hands of the glove puppet separately, each hand manipulating apparatus being operable to manipulate the respective hand of the glove puppet to swivel relative to the body according to the control signals; and
        a head manipulating apparatus interposed between the hand manipulating apparatuses on the body manipulating apparatus for connecting to a head of the glove puppet, the head manipulating apparatus being operable to manipulate the head of the glove puppet to nod,
    wherein the head manipulating apparatus and the foundation are disposed on opposite ends of the body manipulating apparatus,
        wherein each of the hand manipulating apparatuses further comprises:
            a shoulder rotating motor connected to the body manipulating apparatus;
            a shoulder rotating axle disposed on the shoulder rotating motor, wherein the shoulder rotating axle is not parallel to a direction extending from the foundation to the head manipulating apparatus;
            a shoulder rotating block connected to the shoulder rotating axle, wherein the shoulder rotating motor is operable to drive the shoulder rotating block to rotate relative to the body manipulating apparatus according to the control signals;
            an arm swiveling motor connected to the body manipulating apparatus;
            an arm swiveling axle disposed on the arm swiveling motor, wherein the arm swiveling axle is not parallel to the shoulder rotating axle;
            an arm swiveling block connected to the arm swiveling axle, wherein the arm swiveling motor is operable to drive the arm swiveling block to rotate to change an included angle between the arm swiveling block and the arm swiveling motor according to the control signals;
            an elbow bending motor connected to the arm swiveling motor;
            an elbow bending axle disposed on the elbow bending motor; and
            an elbow bending block connected to the elbow bending axle, wherein the elbow bending motor is operable to drive the elbow bending block to rotate to change an included angle between the elbow bending block and the elbow bending motor according to the control signals.

2. The glove puppet manipulating system of claim 1, wherein the body manipulating apparatus comprises:
    a waist twisting motor connected to the foundation;
    a waist twisting axle disposed on the waist twisting motor along a direction extending from the foundation to the head manipulating apparatus; and
    a waist twisting block connected to the waist twisting axle, wherein the waist twisting motor is operable to drive the waist twisting axle and the waist twisting block to rotate relative to the foundation according to the control signals.

3. The glove puppet manipulating system of claim 1, wherein the body manipulating apparatus further comprises:
    a back bending motor interposed between the foundation and the head manipulating apparatus;
    a back bending axle disposed on the back bending motor, wherein the back bending axle is not parallel to a direction extending from the foundation to the head manipulating apparatus; and
    a back bending block connected to the back bending axle, wherein the back bending motor is operable to drive the back bending block to rotate to change an included angle between the back bending block and the foundation according to the control signals.

4. The glove puppet manipulating system of claim 1, wherein the head manipulating apparatus comprises:
    a nodding motor connected to the body manipulating apparatus;
    a nodding axle disposed on the nodding motor, wherein the nodding axle is not parallel to a direction extending from the foundation to the head manipulating apparatus; and
    a nodding block connected to the nodding axle, wherein the nodding motor is operable to drive the nodding block to rotate to change an included angle between the nodding block and the body manipulating apparatus according to the control signals.

5. The glove puppet manipulating system of claim 4, further comprising:
    a connecter connected to the head of the glove puppet; and
    an elastic element connected to the connecter and the nodding block.

6. The glove puppet manipulating system of claim 1, wherein the arm swiveling block is fastened on the shoulder rotating block.

7. The glove puppet manipulating system of claim 1, wherein the elbow bending motor is fastened on the arm swiveling motor.

8. The glove puppet manipulating system of claim 1, wherein each of the hand manipulating apparatuses further comprises:
    a hand connecter connected to the respective hand of the glove puppet; and
    a hand elastic element connected the hand connecter and the elbow bending block.

9. A glove puppet manipulating system comprising:
    a data glove comprising:
        a glove having a plurality of finger cots to be wearable on human fingers, each finger cot having two parts to be wearable on two adjacent joints of the respective finger, wherein the finger cots are shaped to be wearable on a thumb, an index finger, and a middle finger;

at most five angle-measuring sensors disposed on the finger cots for detecting bending angles of the finger cots, wherein the angle-measuring sensors are disposed separately on the two parts of the finger cot for the thumb, the two parts of the finger cot for the middle finger, and one of the two parts of the finger cot for the index finger;

a rotating sensor disposed on the glove for detecting a rotating angle of the glove; and a signal conditioning electrically connected to the angle-measuring sensors and the rotating sensor, the signal conditioning is operable to convert the bending angles into a head control signal, a plurality of left hand control signals, and a plurality of right hand control signals, and convert the rotating angle into a waist twisting control signal;

a glove puppet; and a robot for being installed inside the glove puppet, the robot electrically connected to the control module and comprising:

a foundation;

a body manipulating apparatus disposed on the foundation for connecting to a body of the glove puppet, the body manipulating apparatus being operable to manipulate the body of the glove puppet to rotate relative to the foundation according to the waist twisting control signal;

a left hand manipulating apparatus disposed on the body manipulating apparatus for connecting to a left hand of the glove puppet, the left hand manipulating apparatus being operable to manipulate the left hand to rotate relative to the body according to the left hand control signals;

a right hand manipulating apparatus disposed on the body manipulating apparatus for connecting to a right hand of the glove puppet, the right hand manipulating apparatus being operable to manipulate the right hand to rotate relative to the body according to the right hand control signals; and a head manipulating apparatus interposed between the right hand manipulating apparatus and the left hand manipulating apparatus on the body manipulating apparatus, for connecting to a head of the glove puppet, the head manipulating apparatus being operable to manipulate the head to nod according to the head control signal.

10. The glove puppet manipulating system of claim 9, wherein the body manipulating apparatus comprises:
a waist twisting motor connected to the foundation and electrically connected to the signal conditioning;
a waist twisting axle disposed on the waist twisting motor, and substantially vertical to the foundation; and
a waist twisting block connected to the waist twisting axle,
wherein the waist twisting motor is operable to drive the waist twisting block to rotate relative to the foundation according to the waist twisting control signal.

11. The glove puppet manipulating system of claim 10, wherein the data glove further comprises a tilt sensor disposed on the glove for detecting a tilting angle of the glove, wherein the signal conditioning is electrically connected to the tilt sensor for converting the tilting angle into a back bending control signal.

12. The glove puppet manipulating system of claim 11, wherein the body manipulating apparatus comprises:
a back bending motor electrically connected to the signal conditioning;
a back bending axle disposed on the back bending motor, and substantially vertical to the waist twisting axle; and
a back bending block connected to the back bending axle,
wherein the back bending motor is operable to drive the back bending block to rotate to change an included angle between the back bending block and the foundation according to the back bending control signal.

13. The glove puppet manipulating system of claim 12, wherein the head manipulating apparatus comprises:
a nodding motor fastened on the body manipulating apparatus and electrically connected to the signal conditioning;
a nodding axle disposed on the nodding motor, and substantially vertical to the waist twisting axle; and
a nodding block connected to the nodding axle,
wherein the nodding motor is operable to drive the nodding block to rotate to change an included angle between the nodding block and the body manipulating apparatus according to the head control signal.

14. The glove puppet manipulating system of claim 13, further comprising:
a connecter connected to the head of the glove puppet; and
an elastic element connected the connecter and the nodding block.

15. The glove puppet manipulating system of claim 13, wherein the left hand manipulating apparatus comprises:
a shoulder rotating motor fastened on the body manipulating apparatus and electrically connected to the signal conditioning;
a shoulder rotating axle disposed on the shoulder rotating motor, and substantially vertical to the waist twisting axle; and
a shoulder rotating block connected to the shoulder rotating axle,
wherein the shoulder rotating motor is operable to drive the shoulder rotating block to rotate relative to the body manipulating apparatus according to the left hand control signals.

16. The glove puppet manipulating system of claim 15, wherein the left hand manipulating apparatus further comprises:
an arm swiveling motor electrically connected to the signal conditioning;
an arm swiveling axle disposed on the arm swiveling motor, and substantially vertical to the shoulder rotating axle; and
an arm swiveling block connected to the arm swiveling axle,
wherein the arm swiveling motor is operable to drive the arm swiveling block to rotate to change an included angle between the arm swiveling block and the arm swiveling motor according to the left hand control signals.

17. The glove puppet manipulating system of claim 16, wherein the left hand manipulating apparatus further comprises:
an elbow bending motor connected to the arm swiveling motor and electrically connected to the signal conditioning;
an elbow bending axle disposed on the elbow bending motor, and being substantially vertical to the shoulder rotating axle; and
an elbow bending block connected to the elbow bending axle,
wherein the elbow bending motor is operable to drive the elbow bending block to rotate to change an included angle between the elbow bending block and the elbow bending motor according to the left hand control signals.

18. The glove puppet manipulating system of claim 17, wherein the left hand manipulating apparatus further comprises:
- a hand connecter connected to the respective hand of the glove puppet; and
- a hand elastic element connected the hand connecter and the elbow bending block.

19. The glove puppet manipulating system of claim 9, wherein the data glove further comprises an acceleration sensor disposed on the glove for detecting acceleration of the glove.

20. The glove puppet manipulating system of claim 9, further comprising:
- a recording module electrically connected to the signal conditioning, the recording module being operable to record the head control signal, the left hand control signals, and the right hand control signals as at least a movement package;
- an editing module electrically connected to the recording module, the editing module being operable to edit sequences of the head control signal, the left hand control signals, and the right hand control signals of the movement package; and
- an output module electrically connected to the editing module and the robot, the output module being operable to transfer the edited movement packages to the robot.

21. The glove puppet manipulating system of claim 20, wherein the editing module further comprises a timeline editing module, the timeline editing module comprising a plurality of movement tracks for editing a timeline of the head control signal, the left hand control signals, and the right hand control signals.

22. A glove puppet manipulating system comprising:
- a motion capture module comprising:
  - a camera operable to capture a plurality of images of a first glove puppet manipulated by a human hand;
  - a location detecting module operable to detect distances between a head and hands of the first puppet of each image;
  - a mean-shift tracking module operable to calculate a movement of each finger of the human hand according to the distances between a head and hands of the first puppet, wherein the mean-shift tracking module calculates the movement of a thumb, an index finger, and a middle finger; and
  - an inverse kinematic module operable to generate a plurality of control signals according to the movement of each finger; and
- a robot for being installed inside a second glove puppet, the robot electrically connecting the motion capture module and comprising:
  - a foundation;
  - a body manipulating apparatus disposed on the foundation for connecting to a body of the second glove puppet, the body manipulating apparatus being operable to manipulate the body of the second glove puppet to rotate relative to the foundation according to the control signals;
  - a left hand manipulating apparatus disposed on the body manipulating apparatus for connecting to a left hand of the second glove puppet, the left hand being operable to manipulate the left hand to rotate relative to the body according to the control signals;
  - a right hand manipulating apparatus disposed on the body manipulating apparatus for connecting to a right hand of the second glove puppet, the right hand manipulating apparatus being operable to manipulate the right hand to rotate relative to the body according to the control signals; and
  - a head manipulating apparatus interposed between the right hand manipulating apparatus and the left hand manipulating apparatus on the body manipulating apparatus, for connecting to a head of the second glove puppet, the head manipulating apparatus being operable to manipulate the head to nod according to the control signal.

23. The glove puppet manipulating system of claim 22, wherein the inverse kinematic module is operable to generate at least a left hand control signal according to the movement of the thumb, generate at least a right hand control signal according to the movement of the middle finger, and generate a head control signal according to the movement of the index finger.

24. The glove puppet manipulating system of claim 23, wherein the head manipulating apparatus comprises:
- a nodding motor electrically connected to the motion capture module;
- a nodding axle disposed on the nodding motor; and
- a nodding block connected to the nodding axle,
wherein the nodding motor is operable to drive the nodding block to rotate to change an included angle between the nodding block and the body manipulating apparatus according to the head control signal.

25. The glove puppet manipulating system of claim 24, further comprising:
- a connecter connected to the head of the second glove puppet; and
- an elastic element connected the connecter and the nodding block.

26. The glove puppet manipulating system of claim 25, wherein the left hand manipulating apparatus comprises:
- a shoulder rotating motor fastened on the body manipulating apparatus and electrically connected to the motion capture module;
- a shoulder rotating axle disposed on the shoulder rotating motor, and substantially vertical to the nodding axle; and
- a shoulder rotating block connected to the shoulder rotating axle,
wherein the shoulder rotating motor is operable to drive the shoulder rotating block to rotate relative to the body manipulating apparatus according to the left hand control signal.

27. The glove puppet manipulating system of claim 26, wherein the left hand manipulating apparatus further comprises:
- an arm swiveling motor electrically connected to the motion capture module;
- an arm swiveling axle disposed on the arm swiveling motor, and substantially vertical to the shoulder rotating axle; and
- an arm swiveling block connected to the arm swiveling axle,
wherein the arm swiveling motor is operable to drive the arm swiveling block to rotate to change an included angle between the arm swiveling block and the arm swiveling motor according to the left hand control signal.

28. The glove puppet manipulating system of claim 27 wherein the left hand manipulating apparatus further comprises an elbow bending motor connected to the arm swiveling motor and electrically connected to the motion capture module;

an elbow bending axle disposed on the elbow bending motor, and being substantially vertical to the shoulder rotating axle; and an elbow bending block connected to the elbow bending axle, wherein the elbow bending motor is operable to drive the elbow bending block to rotate to change an included angle between the elbow bending block and the elbow bending motor according to the left hand control signal.

29. The glove puppet manipulating system of claim 28, wherein the left hand manipulating apparatus further comprises:

a hand connecter connected to the respective hand of the glove puppet; and a hand elastic element connected to the hand connecter and the elbow bending block.

30. The glove puppet manipulating system of claim 23, further comprising:

a recording module electrically connected to the motion capture module, the recording module being operable to record the head control signal, the left hand control signal, and the right hand control signal;

an editing module electrically connected to the recording module, the editing module being operable to edit sequences of the head control signal, the left hand control signal, and the right hand control signal; and an output module electrically connected to the editing module and the robot, the output module being operable to transfer the edited head control signal, the edited left hand control signal, and the edited right hand control signal to the robot.

31. The glove puppet manipulating system of claim 30, wherein the editing module further comprises a timeline editing module, the timeline editing module comprising a plurality of movement tracks for editing a timeline of the head control signal, the left hand control signal, and the right hand control signal.

32. The glove puppet manipulating system of claim 31, wherein the timeline editing module comprising at least a sound track for editing at least a sound signal.

* * * * *